United States Patent [19]

Kröner

[11] Patent Number: 4,468,699
[45] Date of Patent: Aug. 28, 1984

[54] CIRCUIT ARRANGEMENT FOR THE CONTROL OF THE VERTICAL DEFLECTION

[75] Inventor: Klaus Kröner, Hamburg, Fed. Rep. of Germany

[73] Assignee: U.S. Philips Corporation, New York, N.Y.

[21] Appl. No.: 358,985

[22] Filed: Mar. 17, 1982

[30] Foreign Application Priority Data

Mar. 20, 1981 [DE] Fed. Rep. of Germany ....... 3110890

[51] Int. Cl.³ .............................................. H04N 5/04
[52] U.S. Cl. ..................................... 358/148; 358/158
[58] Field of Search ................ 358/148, 158, 153, 154

[56] References Cited

U.S. PATENT DOCUMENTS

| 4,319,276 | 3/1982 | Cense | 358/158 |
| 4,348,694 | 9/1982 | McGinn | 358/148 |
| 4,383,273 | 5/1983 | Lunn | 358/148 |

Primary Examiner—Michael A. Masinick
Attorney, Agent, or Firm—Thomas A. Briody; William J. Streeter

[57] ABSTRACT

Field synchronizing circuit arrangement for a television device, in a television receiver or a video magnetic tape reproduction, a frequency divider circuit coupled to the line oscillator producing a field control signal defined by the standard in the absence of an incoming synchronizing signal (indirect synchronization), the frequency divider circuit being rest when said incoming synchronizing signal is present again.

16 Claims, 3 Drawing Figures

CIRCUIT ARRANGEMENT FOR THE CONTROL OF THE VERTICAL DEFLECTION

The invention relates to a circuit arrangement for producing a control signal for the field scanning stage in a television device which device is suitable for receiving a television signal incorporating line and field synchronizing pulses, a plurality of fields constituting an image.

BACKGROUND OF THE INVENTION

Field scanning may here be understood to mean the deflection in the vertical direction of one or more electron beams in a picture display tube. However, it may alternatively relate to controlling the drive of a recording apparatus, for example the number of revolutions of the head disk and/or the tape transport of a video magnetic tape apparatus or the speed of revolution of a video disk, a field frequency and/or phase control being also necessary. Accordingly, a television device must be understood to mean both a television receiver and a picture signal display apparatus of any type.

My U.S. Pat. No. 4,319,276 discloses a circuit arrangement of this type. In this known circuit arrangement the switch over to the direct synchronization operating mode is effected after a given delay when the said given phase relationship which is usually a coincidence has not been established. If no received field synchronizing pulses are available for some reason or other, this switch will therefore be in a state such that a field oscillator which is otherwise synchronized either by the incoming field synchonizing pulses or by the divider pulses now freely oscillates at its natural frequency and this continues as long as no synchronizing pulses are present. This results in a "roll over" in the vertical direction of a displayed image.

It is an object of the invention to provide a circuit arrangement of the type mentioned above in which a free-running field oscillator is not necessary and by means of which a correct field synchronization is maintained, also in case field synchronizing pulses are not received, for example, owing to interference or the disappearance of the signal in a record carrier, while in the presence of field synchronizing pulses which are not in accordance with the standard, direct synchronization may be effected.

The invention provides a circuit arrangement which is characterized in that under the influence of a field synchronizing pulse test stage the switching stage is adapted to be in the position corresponding to the indirect synchronization mode when a predetermined number of received field synchronizing pulses is absent, while the frequency divider circuit resetting means is capable of resetting the frequency divider circuit when said pulses are present again but the said given phase relationship in the comparison stage does not exist.

For the sake of completeness it should be noted that from U.S. patent application Ser. No. 089,006 (now abandoned) it is known to adjust a sawtooth oscillator in the absence of the synchronizing signal to the nominal frequency corresponding to the standard and to switch in other cases to a lower frequency in such a manner that then direct synchronization of the sawtooth oscillator can be effected.

In accordance with one embodiment, the circuit arrangement in accordance with the invention is characterized in that the field synchronizing pulse test stage has an input for applying received field synchronizing pulses and a pulse lengthening stage for generating a test pulse occurring during a substantial portion of the field period for applying it as a control signal to the switching stage, said test pulse having a first signal level in the absence of received field synchronizing pulses and assuming a second signal level in the presence of a field synchronizing pulse.

Thus, it is ensured that, once a field synchronizing pulse has occurred, interference pulses occurring in the lengthened portion do not become active and possibly have a negative effect on the deflection or scanning, respectively. The test pulse may have its trailing edge after the beginning of the field sychronizing pulse. Thus it is ensured that an indirect synchronization by means of the frequency divider once obtained also remains active for the next period.

In accordance with another further embodiment the circuit arrangement in accordance with the invention is characterized by a pulse shaper stage for generating a substitution pulse for the direct synchronization in the absence of a received field synchronizing pulse.

In the circuit arrangement in accordance with the invention identification of the equalizing pulses occurring according to the standard in the synchronizing signal can be effected in a simple manner. These pulses are spaced by half a line period, so they occur at twice the line frequency. A circuit arrangement with identification of equalizing pulses contained in the received synchronizing signal may be characterized by a generator for generating a comparison signal which comprises pulses of the line frequency which are shifted half a line period relative to the received line synchronizing pulses and by means for applying said comparison signal together with the received synchronizing signal to a coincidence stage for generating, when coincidence is established, a switching signal for adjusting the switching stage to the position corresponding to the indirect synchronization.

In one embodiment the circuit arrangement in accordance with the invention is characterized in that the frequency divider circuit resetting means is provided with a switch for interrupting the supply of reset pulses to the frequency divider circuit while the lead between the field synchronizing pulse test stage and the switching stage is also provided by a switch for interrupting said lead, both said switches being closed when said given phase relationship has not existed for said predetermined period of time for thus allowing the frequency divider circuit to be reset and the switching stage to be in the position corresponding to the indirect synchronization mode and being opened when said phase relationship is established in the comparison stage.

SUMMARY OF THE INVENTION

The invention comprises a line generator for generating a signal having a frequency equal to the line frequency or to an integral multiple thereof, a frequency divider circuit connected thereto for producing pulses at field frequency from said line generator signal, means for applying received field synchronizing pulses and pulses produced by said frequency divider circuit to a comparison stage for comparing the phase of said received pulses with the phase of the divider pulses, means for determining the time during which a given phase relationship exists in said comparison stage between the pulses compared therein, resetting means for applying received field sychronizing pulses to said frequency divider circuit for the resetting thereof, the output of the circuit arrangement being switchable by means of a switching stage between a direct synchronization operating mode in which in operation the received field synchronizing pulses or a signal derived therefrom are applied to the field deflection stage and an indirect synchronization operating mode in which in operation the divider pulses are applied to the field deflection stage, the switch over from the direct to the indirect synchronization mode being effected when the given phase relationship in said comparison stage has existed for a predetermined period of time while the switch over from the indirect to the direct synchronization mode is effected when said given phase relationship has not existed for said predetermined period.

BRIEF DESCRIPTION OF THE DRAWINGS

The invention will now be described in detail by way of example with reference to the embodiment shown in the accompanying drawing wherein.

DETAILED DESCRIPTION OF THE PREFERRED EMBODIMENTS

Figure 1:
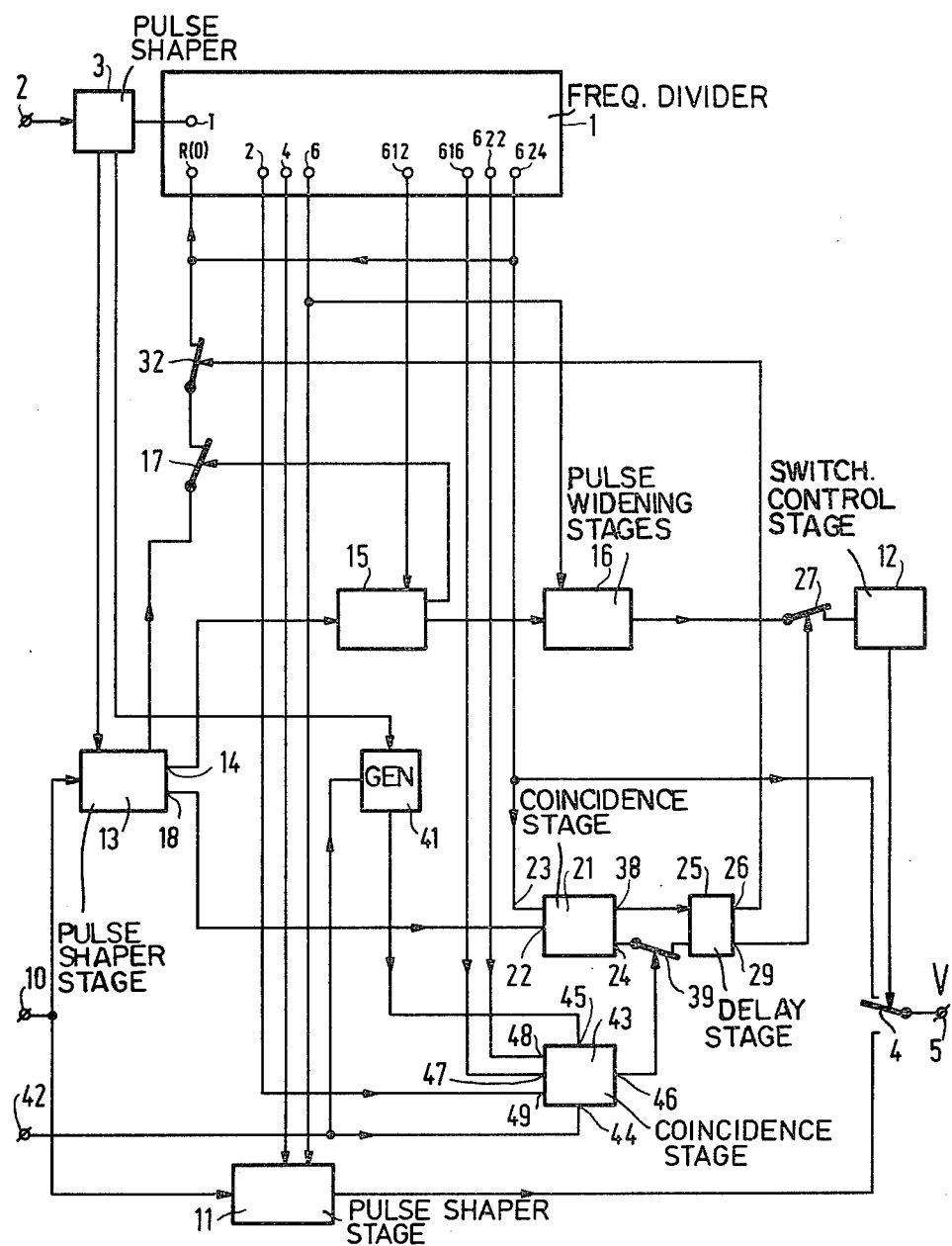
FIG. 1 is a block schematic circuit diagram.
Figure 2:
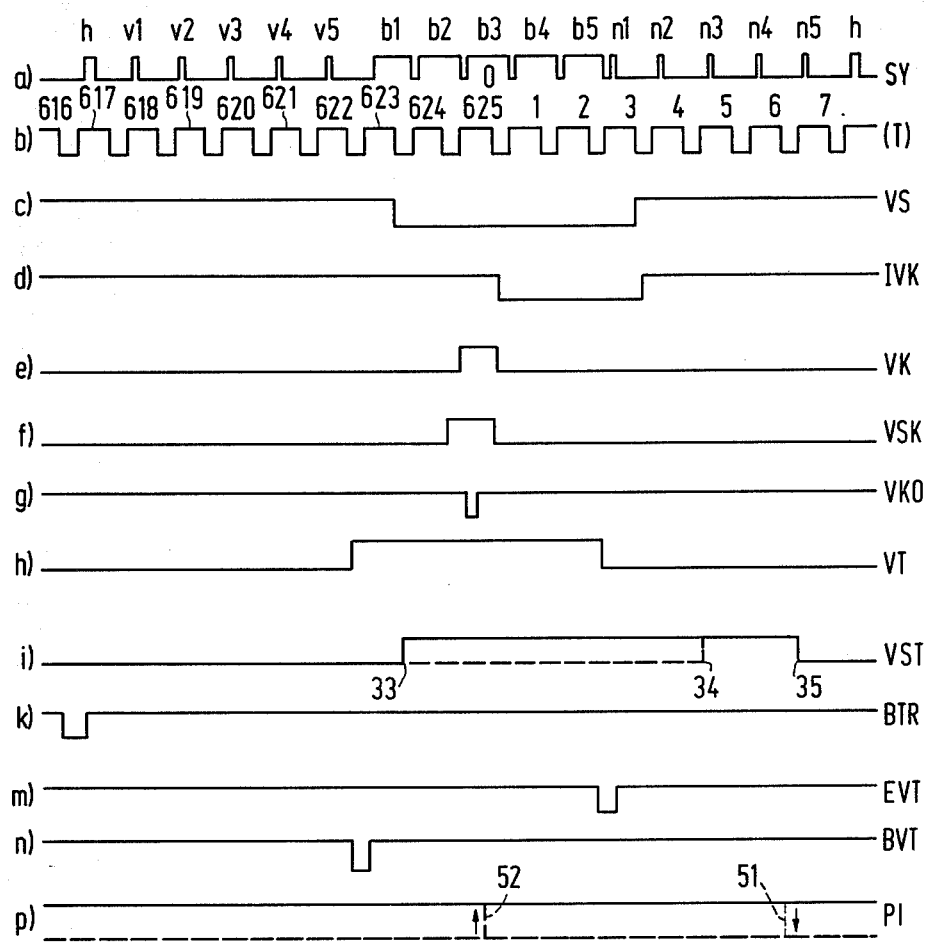
FIG. 2 shows pulses occurring in different points in the vicinity of the field synchronizing interval.

At the top in FIG. 1 there is shown a frequency divider circuit 1 to which from an input terminal 2 clock pulses are applied to a terminal T via a pulse shaper 3, the repetition rate of these clock pulses which are received from a line synchronizing circuit, not shown, being twice the line scanning frequency. These pulses have a shape as shown in FIG. 2b. FIG. 2a shows in comparison with these pulses the composite synchronizing signal SY which in accordance with the television standard comprises: the pre-equalizing pulses v1 to v5, inclusive, field synchronizing pulses containing the partial pulses b1 to 5b, inclusive, the post-equalizing pulses n1 to n5, inclusive and the line synchronizing pulses h. The numbers below the pulse train of FIG. 2a specify, starting from the centre of the field synchronizing pulse, the number of the periods of double the line frequency belonging to a field (half picture), that is to say the periods of the clock pulses at terminal T. The numbers 616 . . . 625 . . . 7 indicate a possible choice of the counting position of counter 1 relative to the synchronizing signal in FIG. 2a.

Pulses appear on the numbered output terminals of divider 1 when within an interval the clock pulse having the relevant number appears on input terminal T. More specifically, on output terminal 624 a signal is obtained which is applied to the input R of the frequency divider 1 for resetting it to a new divider period and is also applied, possibly after pulse shaping, for example widening, to the switching contact of a change-over switch 4. The lug of switch 4 is connected to a terminal 5 from which the control pulse V for a subsequent circuit for the vertical deflection or video memory scanning is taken off. The switch being in the position shown, the vertical deflection is controlled by a reshaped pulse VT, as illustrated in FIG. 2h, which is taken from frequency divider 1. As the frequency of the clock signal of FIG. 2b is locked onto the horizontal (line) deflection on terminal T there is a fixed ratio, defined by the standard between the two deflection frequencies and the vertical deflection is independent of any disturbances in the field synchronizing pulses b1 to b5, inclusive. This may be designated indirect synchronization.

On an input terminal 10 there is a field synchronizing pulse VS which usually varies as shown in FIG. 2c, this synchronizing pulse being, for example, contained in a received signal and being separated from the picture content signals and being reshaped. This pulse is applied to a pulse shaper stage 11 in which undesirable interruptions are removed and the pulse is given a determined shape. The field synchronizing pulse VST shown in FIG. 2i and thus improved in stage 11 is applied to that contact of change-over switch 4 which is shown at the bottom in the Figure. If then change-over switch 4 is adjusted to the other position by means of a switch control stage 12, the field synchronizing pulse of FIG. 2i is made operative on output terminal 5 and controls the vertical deflection circuit. This may be designated direct synchronization.

The field synchronizing pulse VS received from terminal 10 is further applied to a stage 13, in which this pulse is given the shortened pulse shape IVK which is shown in FIG. 2d and approximately corresponds to the second half of the field synchronizing pulse VS. Pulse IVK is available on a first output terminal 14 and is applied to an input terminal of a pulse widening stage 15, in which pulse IVK is considerably widened, namely to the next half line (clock period) 612. The pulse obtained has a duration of approximately 98% of the duration of 625 pulses at half the line frequency which form a field deflection period, which corresponds to half a picture. Stage 15 may be in the form of a bistable element which receives at its first input terminal the pulse signal IVK and on its resetting input terminal a pulse from the divider output 612.

The wide pulse obtained on a first output of stage 15 is applied to the input of a second pulse widening stage 16, in which the duration of this pulse is lengthened, for example by means of a bistable element, to the period 6, coming after clock period 612, of the next field deflection period so that a test pulse PI is formed, which is partly shown in FIG. 2p. The element in stage 16 is of such a construction that the trailing edge of its output pulse is not produced in the clock period 6 with the descending edge 51 shown in FIG. 2p by means of broken lines, when the input pulse of stage 15 which has a duration from the divider period 0 to 612, inclusive, and which therefore has started with an ascending leading edge 52, shown by means of broken lines, is simultaneous present. Consequently, the leading edge of this pulse and the pulse supplied by divider output 6 overlap, so that the upper edge of the signal of stage 16 maintains its highest value. As long as pulses are periodically applied from stage 15 to stage 12, the output pulse of stage 16 cannot be reset, so that a signal is continuously applied to switch control stage 12. This control stage adjusts switch 4 to the position shown and the switching stage formed by switch control stage 12 and change-over switch 4 then continuously supplies control pulses VT from terminal 5 for controlling the field deflection circuit.

The pulse shortening stage 13, which may comprise a counter which is switched by clock pulses applied from stage 3 furthermore produces pulses VK on the resetting input terminal R of frequency divider 1. Such a pulse has the shape shown in FIG. 2e; a pulse is produced shortly before the pulse illustrated by FIG. 2d, shortly before the centre of the pulse illustrated by FIG. 2c. Pulse VK resets frequency divider 1, which, particularly on switch-on or switch-over of the television set may have any arbitrary phase position relative to the own resetting pulse of frequency divider 1 transferred from output 624, so that synchronization must be effected. After this resetting operation a clock period indicated by 0 is effected, so that the divider has a total of 625 periods.

From a second output terminal of stage 15 a switch 17 is opened by means of a signal corresponding to a lengthened pulse, as soon as the leading edge of pulse IVK which is decisive for the synchronization has appeared. This results in that, up to clock period 612, a repetition of resetting of frequency divider 1, which had been effected shortly prior thereto, is prevented from occurring; any interference occurring in this period of time do therefore have no effect.

From stage 13, from a second output terminal 18 thereof, another shortened field synchronizing signal VSK, which in accordance with FIG. 2f also occurs prior to signal IVK and prior to signal VK, is applied to a first input terminal 22 of a coincidence stage 21. To a second input terminal 23 of stage 21 there is applied a pulse VKO in accordance with FIG. 2g which is compared with the signal on terminal 22 and has been taken off from, for example the output 624 of frequency divider 1. The pulse VSK on terminal 18 is derived from field sychronizing pulse VS and is shortened to approximately half a line period. In contrast therewith, comparison pulse VKO is derived from the frequency divider and has a duration of only approximately 30% compared with the said pulse.

When there is coincidence between the pulses VSK and VKO applied to stage 21, a control criterion is supplied from an output terminal 24 of stage 21 via a delay stage 25 and an output terminal 29 thereof for the purpose of opening a switch 27 arranged between stage 16 and switch control stage 12. Switch control stage 12 can then not be supplied with a signal and switch 4 is in the rest position shown in which indirect synchronization is effected by means of pulses VT (FIG. 2h) applied from divider 1 to output terminal 5. This is the normal operating condition as, in the event of coincidence, a signal in accordance with the standard and having the proper phase is present, so that direct synchronization is not necessary. In addition, from a second output terminal 26 of delay stage 25 a control signal, illustrated by a solid line, is applied to a switch 32, causing this switch to be opened, so that no synchronization of the frequency divider 1 from stage 13 can occur. Also this situation corresponds to the said operating condition as in this operating condition the proper phase is already present, so that there is no need to change the synchronization.

Three operating conditions can be distinguished:
1. Standard signal.

There is coincidence. Switch 27 is opened, Switch 4 is in the position shown and indirect synchronization is effected.

2. Missing input signals.

There is no coincidence; switch 27 is closed. Synchronizing pulses VS are, however, also missing and stage 16 consequently does not produce an output signal. Switching stage 4, 12 remains in the rest position shown and the arrangement of FIG. 1 generates internally a field deflection signal which corresponds to the standard in accordance with the dividing ratio. The line oscillator, based on this ratio and which produces the clock pulses for divider 1 is a self-oscillating oscillator and operates independently of the presence of synchronizing pulses.

3. Non-standard signal.

There is no coincidence. Switch 27 is closed. However, stage 16 produces an output signal owing to the presence of field synchronizing pulses VS and operates switching stage 4, 12. Switch 4 then changes to the other position, so that the incoming field synchronizing pulses VS are transferred to output terminal 5 via stage 11 and direct synchronization of the field deflection is effected.

The field synchronizing pulse test stage formed by stages 15 and 16 cannot detect the absence of a synchronizing pulse VS until the instant at which such a pulse may be expected, so when, for example, the divider periods 623 to 3, inclusive have ended. Then, when the circuit is adjusted to direct synchronization, the field deflection circuit will not have received a pulse. So the deflection is disturbed in some way or other. Difficulties occur particularly when, as, for example, in a video magnetic tape apparatus, depending on the field synchronizing pulse, a mechanical scanning means, for example the motor of a head disk, is adjusted. The disappearance of a field synchronizing pulse then produces an incorrect phase position in an apparatus having two heads so that a strong control pulse is produced which is repeated or widened, respectively, until the correct synchronization has been obtained again.

For this reason a substitution pulse which becomes operative preferably after the normally occurring pulse VS which satisfies the standard has ended, is added to the field synchronizing pulse VS from terminal 10 in stage 11. Advantageously, the pulse VST in accordance with FIG. 2i is formed for that purpose, the leading edge 33 of which is produced by the leading edge of field synchronizing pulse VS or, should this synchronizing pulse be missing, by an edge 34, which occurs in the divider period 4 of frequency divider 1. In either case, the trailing edge 35 is formed by an edge produced in the divider period 6 of the frequency divider 1. For this purpose the outputs 4 and 6 of divider 1 are connected to suitable inputs of stage 11. Also in the event a non-standard signal disappears or is interrupted, or when a switch to a different video signal source is effected, for example to another transmitter or another studio of the same transmitter, at least a shortened synchronizing signal VST having the edges 34 and 35 is produced continuously as the substitution pulse. The subsequent field deflection circuit is then subjected to a small phase shift of a brief duration only which is disturbing to a small extent only and is rapidly corrected.

The leading edge 34 of the substitution pulse shown in FIG. 2i might even be shifted still further to the beginning of the standard pulse in the divider period 623. The distance between the leading edge of the standard pulse and the leading edge of the substitution pulse is, however, the region in which direct synchronization is possible, so that the shown and described position of the substitution pulse is advantageous.

If the incoming signal is in accordance with the standard and is in coincidence with the divider signal, a switch to direct synchronization in the event of coincidence which disappears momentaneously, for example only once, must be prevented from occurring because switch 27 then closes. For that purpose, a delay stage 25 to which a signal is applied from output 24 in the event of coincidence is connected to the output terminal 24 of coincidence stage 21. As soon as this coincidence signal is produced it is immediately conveyed to the output terminals 26 and 29 of stage 25, causing switches 27 and 32 to be opened. If there is no coincidence, a non-coincidence signal is produced at a second output terminal 38 of coincidence stage 21, which signal is applied to a second input terminal of delay stage 25. As a result thereof switches 27 and 32 are not immediately readjusted to the rest position shown in the drawing. Not until the non-coincidence signal from output 38 has appeared several times, for example 4 to 20 times, preferably 6 times, on the associated input of delay stage 25 there is produced a control signal on each output 26 and 29, causing switches 27 and 32 to be readjusted to the position shown in FIG. 1.

Moreover, it may be the aim to effect the switching actions which depend on the incoming field synchronizing pulse only then if a synchronizing signal which is formed in accordance with the standard is present. A criterion therefor is the occurrence of the equalizing pulses v1 to v5, inclusive and/or m1 to m5, inclusive in the synchronizing signal SY shown in FIG. 2a. Then a switching signal must be formed which becomes active at the occurrence of equalizing pulses. To that end, a comparison signal formed by pulses hp at line frequency, whose phase is shifted by half a line period relative to the line synchronizing pulses h contained in the incoming synchronizing signal (SY, FIG. 2a) and whose duration is somewhat longer than the duration of the equalizing pulses, is produced in a generator 41, which is controlled via pulse shaper 3 by pulses of twice the line frequency, approximately corresponding to FIG. 2b, without any change in shape in the region of the vertical pulse. To ensure this phase position, generator 41 is further connected to a point at which a signal in accordance with incoming line pulses appears. For that purpose a connection is provided in FIG. 1 to an input terminal 42, to which a composite synchronizing signal according to the standard is applied.

The signal from terminal 42 is also applied to an input terminal 44 of a second coincidence stage 43. The signal produced by generator 41 is applied to a second input 45 of stage 43. On an output terminal 46 this stage 43 produces a signal when between the preequalizing pulses v2 and v4, shown in FIG. 2a which correspond to the horizontal pulses, further preequalizing pulses v1, v3 and/or v5 are produced, which occur in the centre between horizontal pulses. The signal from output 46 maintains a switch 39 provided between the output 24 of the first coincidence stage 21 and delay stage 25 in the open condition when there is no coincidence in stage 43 and maintains this switch in the closed condition as soon as coincidence occurs. Thus it is ensured that the first coincidence stage 21 which operates at the field frequency applies an output signal which indicates coincidence to the delay element 25 only when this coincidence occurs in the interval of a field synchronizing pulse according to the standard; in this way disturbance occurring outside this interval cannot cause coincidence. For non-standard signals which do not contain equalizing pulses of twice the line frequency, the field frequency is as a rule not laid down accurately and in accordance with the standard relative to the line frequency, so that for that reason a lone coincidence would not occur and operation with direct synchronization is effected.

In order to obtain a stable switching signal for switch 39, the switching signal obtained when there is coincidence with an equalizing pulse in stage 43 is stored preferably by means of a bistable element during a given period of time, for example a number of line periods, and widened thusly. Resetting the memory thus formed may be effected by a resetting signal EVT derived from divider 1. Storing the switching signal is maintained until at least approximately the end of the signal portion containing the equalizing pulses, preferably to the end of the interval in which the field synchronizing pulses b1 to b5, inclusive, of FIG. 2a occur. The resetting signal EVT applied to an input terminal 49 of stage 43 may be taken from frequency divider 1 during the second divider period 2 (see FIG. 2m).

To prevent disturbances from being processed as equalizing pulses it is advantageous to make stage 43 operative only during a synchronizing signal portion containing equalizing pulses, particularly during the equalizing pulses v1 to v5, inclusive, in FIG. 2a. For that purpose stage 43 is enabled by a switching stage contained therein which is controlled in such a manner, by frequency divider 1, which operates as a local field oscillator, that it is enabled by a pulse BTR as shown in FIG. 2k, approximately at the beginning of the preequalizing interval until prior to the retrace of the vertical deflection, and that stage 43 is blocked approximately at the end of the retrace by a pulse BVT as shown in FIG. 2n. For that purpose, further input terminals 47 and 48 of stage 43 are connected to divider outputs 616 and 622, which produce the pulses shown in FIG. 2k and 2n, respectively and which limit, at least approximately, the region of the preequalizing pulses v1 to v5, inclusive in FIG. 2a.

Figure 3:
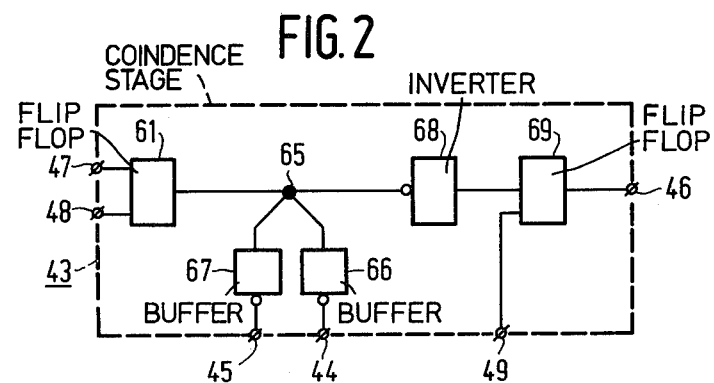
FIG. 3 shows a detail of the circuit arrangement by means of which it is possible to identify the pre-equalizing pulses.

FIG. 3 shows a circuit arrangement corresponding with coincidence stage 43 of FIG. 1 and serving to identify the equalizing pulses. The pulses BTR as shown in FIG. 2k and BVT as shown in FIG. 2n, respectively are applied to the setting input terminal 47 and to the resetting input terminal 48 of a flipflop 61. The output of flipflop 61 changes to a high value with a high internal resistance when at input 47 the signal changes from a high value to a low value, while the output of flipflop 61 switches to a low value having a low internal resistance, more or less forming a short circuit to ground, when at the input 48 the signal changes from a high value to a low value.

The output signal from stage 61 is applied to a junction point 65 which is connected to the output terminals of two buffer stages 66 and 67. The sychronizing signal SY of FIG. 2a is applied to stage 66 via input terminal 44. The above-mentioned comparison signal containing pulses hp of the line frequency is applied to the input terminal 45 of stage 67. Stages 66 and 67 may be in the form of inverter stages. The pulses hp of said comparison signal which occur in the centre between the line pulses in the signal SY are continued without interruption, also after the field synchronizing interval and occur with the correct phase between the line pulses of the next field. The above described circuit detects the presence of the two or three equalizing pulses, respectively occurring between line pulses and derives an identification signal therefrom.

In the comparison signal hp which is applied to terminal 45 and contains pulses having a duration of, for example, 3 to 8 μs and in the synchronizing signal SY applied to terminal 44, the pulses are going in the positive direction. Buffer stages 66 and 67 have a high internal resistance in point 65 during the occurrence of said pulses, while outside the occurrence of these pulses their outputs form practically a short circuit versus ground. So point 65 has a high potential only then when a pulse on terminal 47 has adjusted the output of flipflop 61 to a high potential and if at the simultaneous occurrence of the comparison pulse and an equalizing pulse the high potential in point 65 is not affected and is conveyed to an inverter stage 68. So coincidence is detected in point 65. An input signal occurring for a determined period of time is conveyed further only when in this period of time also the signals on terminals 44 and 45 occur simultaneously.

At coincidence in point 65, the output of inverter stage 68 is switched to a low value and as a result thereof operates the setting input terminal of a flipflop 69, whose output terminal 46 then produces a signal which is characteristic of the occurrence of equalizing pulses. In FIG. 1 this signal is used to close the switch 39 situated at the output 24 of the first coincidence stage 21.

The said output signal is obtained in the circuit of FIG. 3 even in the case coincidence between the signals hp and SY occurs one single time only. The output signal remains available until flipflop 69 is reset again. Advantageously, this is effected at the end of pulse VS (FIG. 2c) by means of a pulse EVT (FIG. 2m) applied to the resetting input terminal of flipflop 69 from terminal 49. As a result thereof the switching signal obtained from coincidence between the equalizing pulses and the comparison signal is stored from the preequalizing interval until approximately the end of the field synchronizing interval, so that a proper utilisation in the subsequent widening stage 25 is possible.

What is claimed is:

1. A circuit arrangement for producing a control signal for the field scanning stage in a television device which device is suitable for receiving a television signal incorporating line and field synchronizing pulses, and a plurality of fields constituting an image, said arrangement comprising:
    a line generator for generating a signal having a frequency equal to the line frequency or to an integral multiple thereof,
    a frequency divider circuit connected thereto for producing pulses at field frequency from said line generator signal,
    signal comparison means,
    means for applying received field synchronizing pulses and pulses produced by said frequency divider circuit to said signal comparison means for comparing the phase of said received pulses with the phase of the divider pulses,
    means operatively connected to said signal comparison means for determining the time during which a given phase relationship exists in said signal comparison means between the pulses compared therein,
    resetting means for applying received field synchronizing pulses to said frequency divider circuit for the resetting thereof,
    first switching means responsive to said signal comparison means and adapted to be actuated between a direct synchronization operating mode in which the received field synchronizing pulses or a signal derived therefrom are applied to said field scanning stage and in an indirect synchronization operating mode in which the divider pulses are applied to said field scanning stage, the change from the direct to the indirect synchronization mode being effected when the given phase relationship in said signal comparison means has existed for a predetermined period of time and the change from the indirect to the direct synchronization mode being effected when said given phase relationship has not existed for said predetermined period,
    and further comprising a field synchronization pulse test stage, said first switching means being further responsive to said field synchronization pulse test stage for being in the indirect synchronization mode when a predetermined number of received field synchronizing pulses is absent, said resetting means being enabled to reset said frequency divider circuit when said pulses are present again.

2. A circuit arrangement as in claim 1, wherein said field synchronizing pulse test stage has an input adapted to receive synchronizing pulses and comprises a pulse lengthening stage for generating a test pulse occurring during a substantial portion of the field period, and means for applying said test pulse as a control signal to said first switching means, said test pulse having a first signal level in the absence of received field synchronizing pulses and a second signal level in the presence of a field synchronizing pulse.

3. A circuit arrangement as claimed in claim 2, wherein said test pulse has its trailing edge after the beginning of the field synchronizing pulse.

4. A circuit arrangement as claimed in claim 1 comprising a pulse shaper stage for generating a substitution pulse for the direct synchronization in the absence of a received field synchronizing pulse.

5. A circuit arrangement as claimed in claim 4, wherein said substitution pulse is produced after the end of a normally occurring field synchronizing pulse.

6. A circuit arrangement as claimed in claim 5, wherein said pulse to be used for the direct synchronization has a leading edge which occurs simultaneously with the leading edge of the field sychronizing pulse or after the end of a field synchronizing pulse.

7. A circuit arrangement as claimed in claim 1, with an identification of equalizing pulses contained in the received synchronizing signal, comprising a generator for generating a comparison signal which comprises pulses of the line frequency which are shifted half a line period relative to the received line synchronizing pulses and by means for applying said comparison signal together with the received synchronizing signal to a coincidence stage for generating, when coincidence is established, a switching signal for adjusting the switching means to the position corresponding to the indirect synchronization.

8. A circuit arrangement as claimed in claim 7, comprising a memory for storing the switching signal during a plurality of line periods.

9. A circuit arrangement as claimed in claim 8, comprising means for storing the switching signal during the preequalizing interval and the field synchronizing interval.

10. A circuit arrangement as claimed in claim 7 wherein said coincidence stage is enabled only during a field synchronizing signal portion containing preequalizing pulses.

11. A circuit arrangement as claimed in claim 1, wherein said frequency divider circuit resetting means is provided with a switch for interrupting the supply of reset pulses to the frequency divider circuit under in response to the field synchronizing pulse test stage for preventing a repeated resetting of said frequency divider circuit.

12. A circuit arrangement as in claim 1, further comprising second switch means for interrupting the supply of reset pulses to the frequency divider circuit while the lead between the field synchronizing pulse test stage and the switching stage is also provided with third switch means for interrupting the output of said pulse test stage in response to said signal comparison means, both of said second and third switch means being closed when said given phase relationship has not existed for said predetermined period of time for allowing the frequency divider circuit to be reset and the first switch means to be in the position corresponding to the indirect synchronization mode and being opened when said phase relationship is established at the signal comparison means.

13. Apparatus for producing scanning field synchronization control signals at an output in a television receiver in response to transmitted field synchronization signals and line synchronization signals comprising:
   a first input terminal adapted to receive line synchronization signals;
   a second input terminal adapted to receive field synchronization signals;
   first signal deriving means operatively connected to said first input terminal for deriving indirect field synchronization control signals;
   second signal deriving means operatively connected to said second input terminal for deriving direct field synchronization control signals;
   comparison means operatively connected to said first and second signal deriving means for producing an output signal indicative of the phase relationship between said field synchronization signals and said line synchronization signals;
   switch means responsive to said comparison means for enabling passage of said indirect synchronization control signals and disabling passage of said direct synchronization control signals to said output in response to similarity in said phase relationship, and for disabling passage of said indirect synchronization control signals and enabling passage of said direct synchronization control signals to said output in response to dissimilarity in said phase relationship, and
   field synchronization signal detection means operatively connected to said second input terminal for determining the absence of field synchronization signals and substitute signal deriving means for producing substitute synchronization signals in response thereto, said switch means applying said substitute synchronization signals to said output.

14. Apparatus according to claim 13 further comprising means for resetting said first signal deriving means in response to said transmitter field synchronization signals, said resetting means being disabled while said substitute synchronization signals are applied to said output in the absence of said transmitted synchronization signals.

15. Apparatus according to claim 14 wherein said substitute signal deriving means is operatively connected to said first signal deriving means for deriving said substitute signals therefrom.

16. Apparatus according to claim 15 further comprising means for disabling said substitute signal deriving means and enabling said "resetting" means in response to the resumption of said transmitted field synchronization signals.

* * * * *